Aug. 23, 1938.  W. H. PARNELL  2,128,013
BRAKE
Filed March 12, 1937  3 Sheets-Sheet 1

INVENTOR.
WALTER H. PARNELL
BY A. A. de Romeville
ATTORNEY.

Aug. 23, 1938.    W. H. PARNELL    2,128,013
BRAKE
Filed March 12, 1937    3 Sheets-Sheet 2

INVENTOR.
WALTER H. PARNELL
BY A A de Bonneville
ATTORNEY.

INVENTOR.
WALTER H. PARNELL
BY A. A. de Bonneville
ATTORNEY.

Patented Aug. 23, 1938

2,128,013

UNITED STATES PATENT OFFICE 2,128,013

BRAKE

Walter H. Parnell, Brooklyn, N. Y., assignor of one-half to Jacob Silverstein, New York, N. Y.

Application March 12, 1937, Serial No. 130,460

10 Claims. (Cl. 188—2)

This invention relates to brakes.

The object of the invention is the production of a brake which travels in a direction opposite to the member with which it coacts.

The second object of the invention is the production of a brake which revolves when functioning.

The third object of the invention is to production of a brake which avoids the sudden locking thereof and thereby avoids the skidding of a vehicle.

The fourth object of the invention is the production of a revolving brake, which contacting with a rotating drum, provides increased frictional contact with the drum in an interval of time.

The fifth object of the invention is the production of a moveable brake, which is not only applicable to the brake drum of a vehicle, but which can act with a moveable object having a flat surface.

Figure 1:
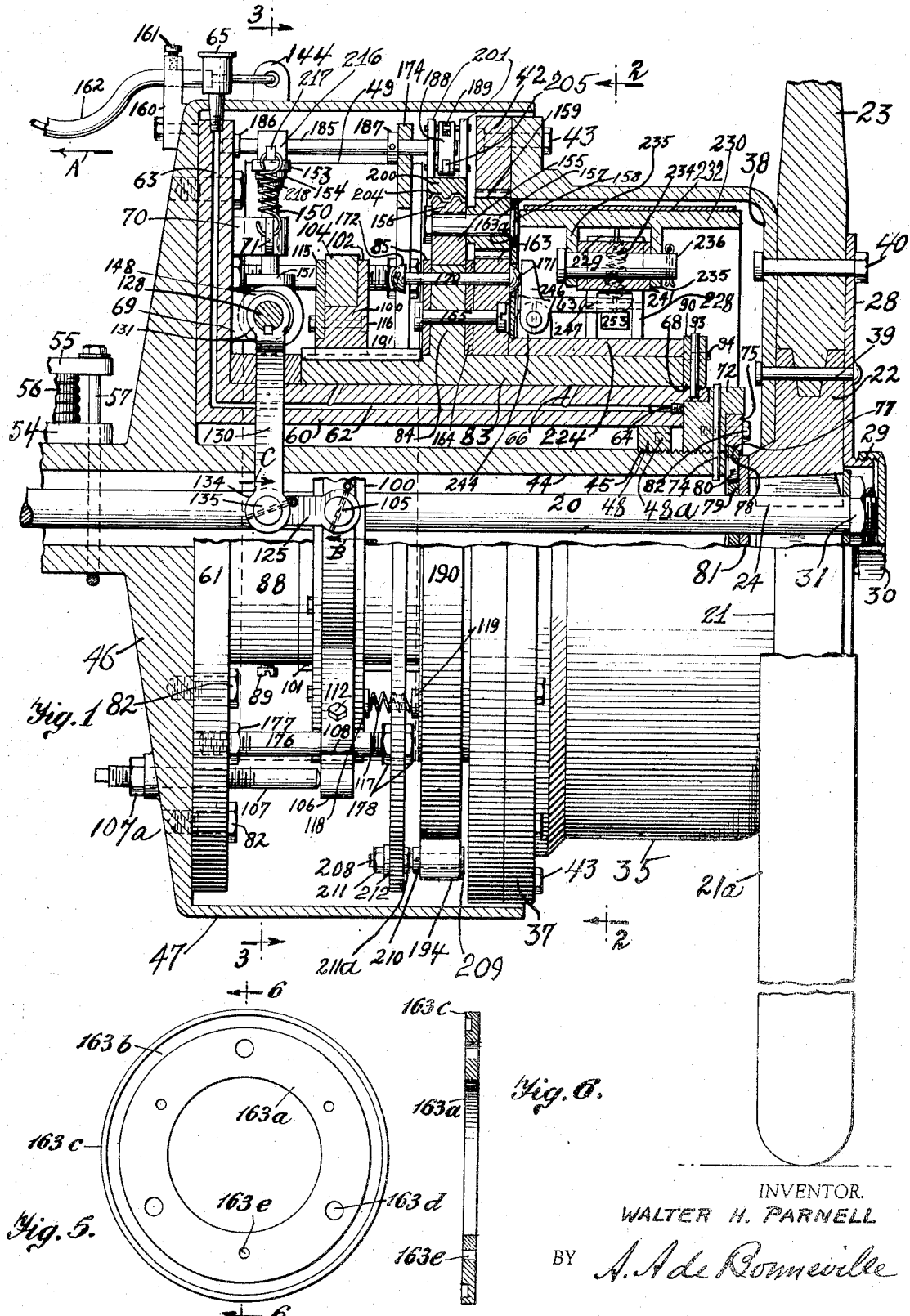
Figure 2:
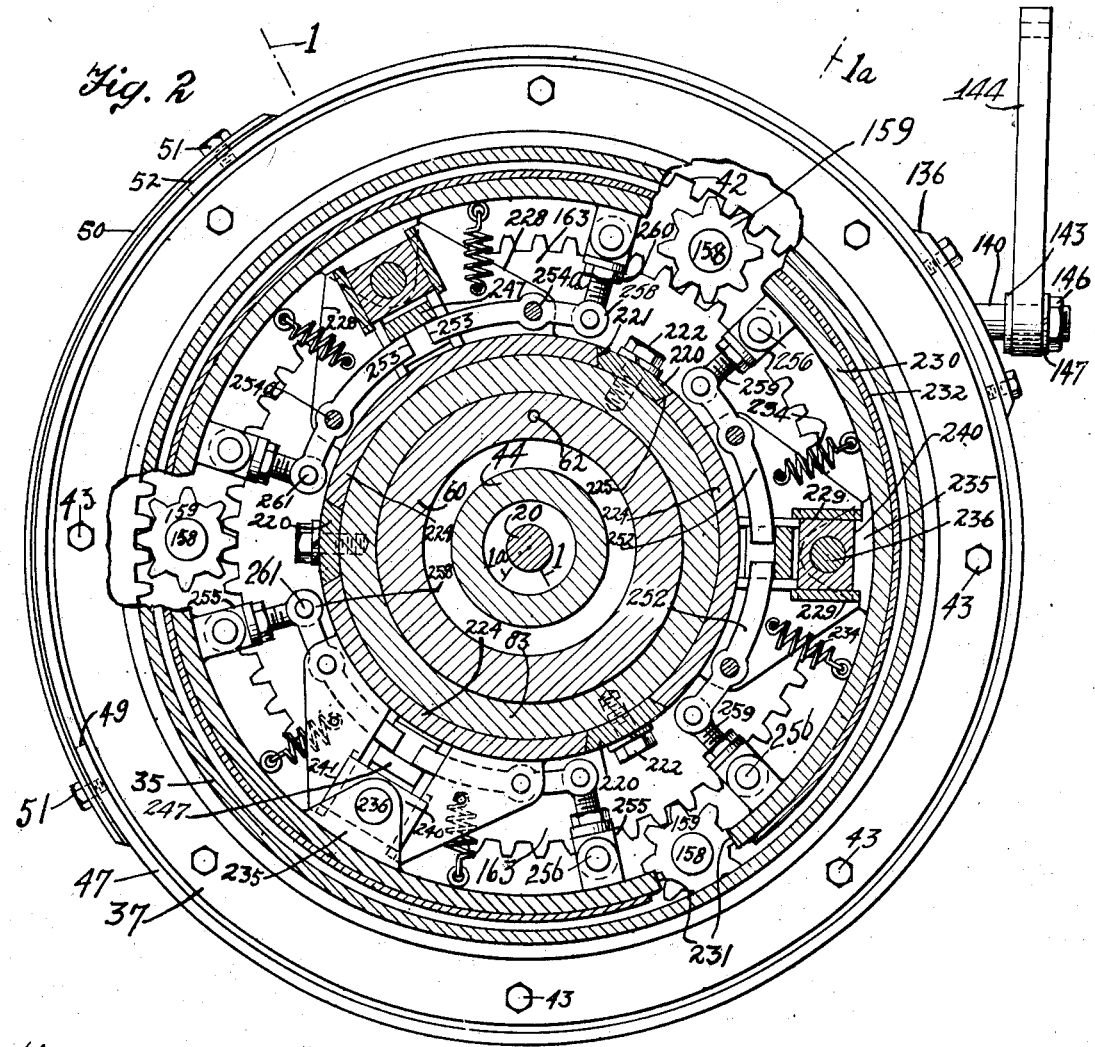
Figure 4:
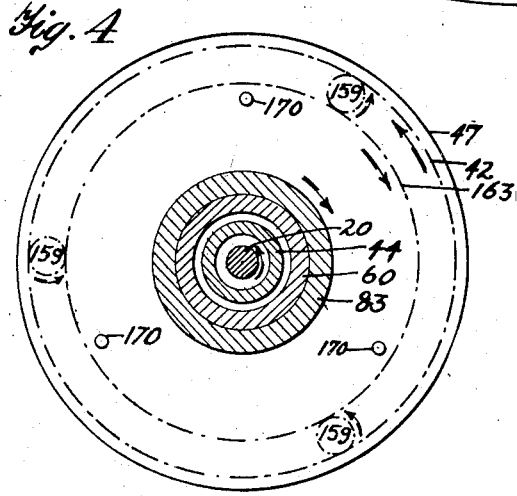
Figure 3:
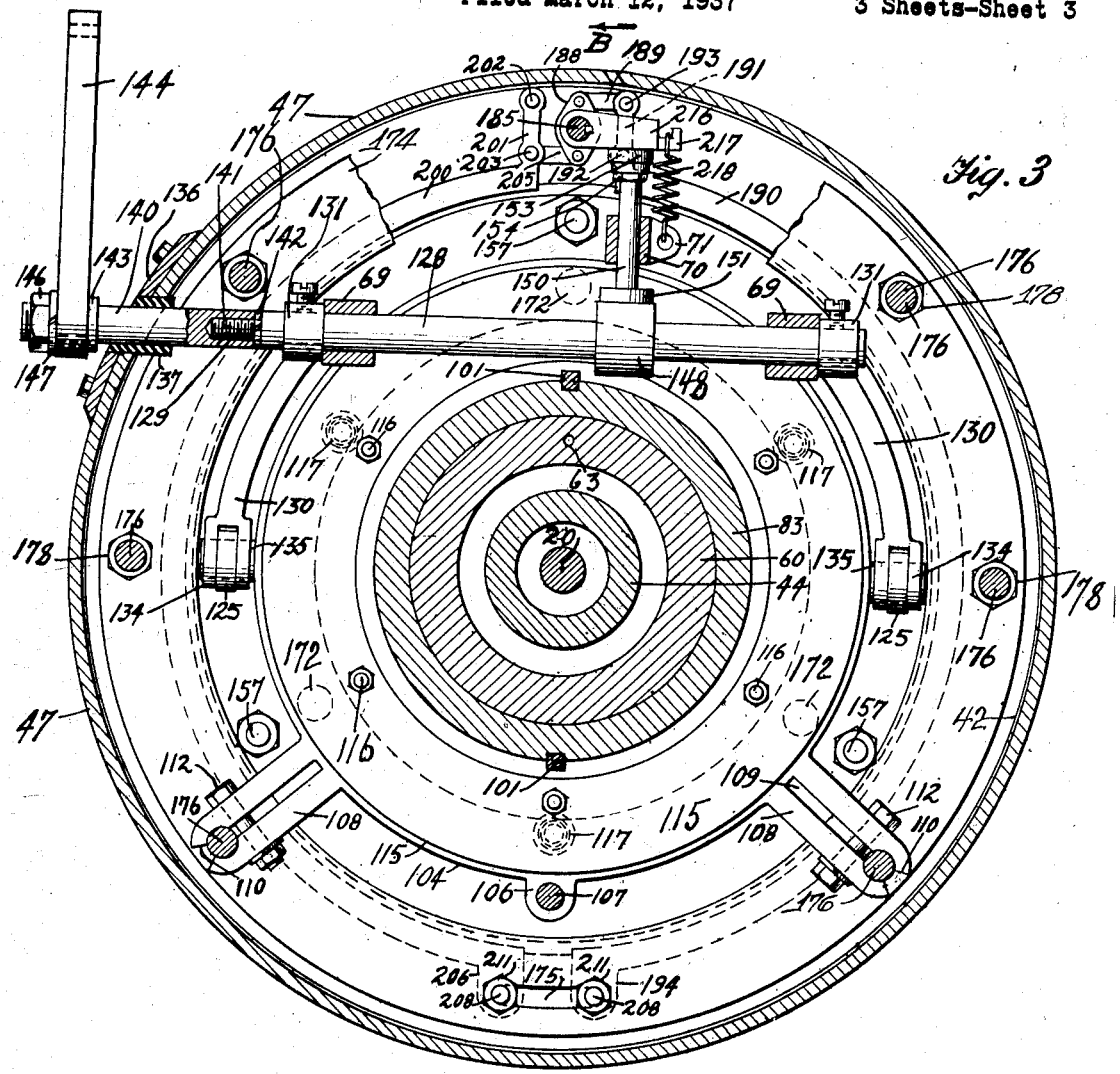

In the accompanying drawings Fig. 1 shows a partial side elevation of an exemplification of a revolving brake, with one of the rear wheels of a vehicle to which it is attached, and sections of Fig. 2 on the line 1, 1 and 1a, 1a; Fig. 2 represents a section of Fig. 1 as on the line 2, 2; Fig. 3 indicates a section of Fig. 1 on the line 3, 3; Fig. 4 shows a fragmentary portion of Fig. 2 on a reduced scale and diagrammatic portions of the brake of the invention; Fig. 5 is a plan view of an oil guard disc and Fig. 6 shows a section of Fig. 5 on the line 6, 6.

Referring to Figs. 1 to 4 inclusive, the revolving brake is indicated as applied to the rear of a motor vehicle. The rear axle of the vehicle is shown at 20 and one of the rear wheels is indicated at 21. The hub 22 of said rear wheel is indicated with spokes, one of which is indicated at 23. The wheel 21 having the tire 21a is keyed to the shaft 20 by means of the key 24. The hub plate 28 is indicated with the threaded sleeve 29 which supports in threaded engagement the hub cap 30, which encloses the nut 31 of the axle 20.

One of the brake drums of the rear wheels of the vehicle is indicated in its entirety by the numeral 35. Each brake drum 35 at its inner end has integral therewith the supporting flange 37, and at its outer end is shown the clamping wall 38. Rivets 39 connect the wall 38, hub 22 and the plate 28, and the bolts 40 connect the wall 38, the spokes 23 and the hub plate 28.

An internal ring gear 42 is bolted to the flange 37 by means of the bolts 43, and the said ring gear 42 meshes with the pinions 159, to be hereinafter described. The rear axle housing 44 is indicated with the exterior thread 45 at one end thereof. The said housing 44 has the wall 46 at right angles to its longitudinal axis and from the latter extends the drum 47, which latter with the said wall 46 provides a housing for the mechanism of the brake. A supporting collar 48 with adjusting openings 42a, of which one is shown, engages the thread 45 of the axle housing 44. In the drum 47 is indicated an opening 49 for adjusting the lift rod 150 to be hereinafter described.

A cover plate 50 is detachably fastened to the drum 47, by means of the bolts 51. A gasket is shown at 52 and is positioned between the said cover plate 50 and the drum 47. The saddle 54 is integral with the housing 44. A top plate is shown at 55 and a spring of the vehicle is shown at 56. The usual U bolts 57 connect the axle housing 44, the saddle 54 and the top plate 55.

A stationary supporting barrel 60, at one end has the disc 61, integral therewith, and bears upon the collar 48 at its other end. An oil hole 62 in the barrel 60 connects with the oil hole 63 in the disc 61. A screw plug 64 is indicated at one end of the oil hole 62 and an oil cup 65 is shown at the outer end of the oil hole 63. Openings 66 extend from the outer circumferential face of the barrel 60 and lead to the hole 62. A pair of supporting brackets 69 and a guide bracket 70 having the lug 71 with an opening extend from the disc 61.

A roller bearing housing 72 is indicated in threaded engagement with the axle housing 44, and a retaining pin 74 locks the housing 72 in operative position. A detachable clamping ring 75 is bolted to the housing 72. The ring 75 has integral therewith the tapered bearing surface 77. The races of the roller bearing are indicated at 78 and 79 for the roller bearings 80. A washer 81 encircles the axle 20 and bears between the roller bearings 80 and the hub 22. The disc 61 is fastened to the wall 46 of the rear axle housing 44 by the bolts 82.

A sleeve 83 having the annular flange 84 is journaled on the stationary supporting barrel 60, and an annular plate 85 bears against the flange 84. A stop collar 88 is fastened to the barrel 60, by means of the set screws 89, at one end of the sleeve 83, and a stop collar 90 is in threaded engagement with the other end of the barrel 60. A pin 93 locks the collar 90 to the barrel 60 and a set screw 94 bears against the pin 93.

A thrust collar 100 is slidably supported on the rotating sleeve 83, and a pair of feathers 101 are interposed between the sleeve 83 and the thrust collar 100. The latter has integral therewith the circumferential flange 102. The thrust collar ring 104 bears on the outer circumferential surface of the thrust collar 100 and against the inner face of the flange 102. A pair of diametrically opposite pins 105 extend from the thrust collar ring 104. A lug 106 extends from the thrust collar ring 104, and an adjusting pin 107 has the clamping nut 107a in adjustable threaded engagement with the disc 61 and passes through the wall 46. The pin 107 bears against the lug 106. A pair of guide brackets 108 each having a guide slot 109, with the tapered openings 110 extend from the ring 104. A clamping bolt 112 is provided for each of the brackets 108. An annular plate 115 is fastened to the thrust collar 100, by means of the bolts 116. The springs 117 bear between the thrust collar 100 and the annular plate 85. Cups 118 extend from the thrust collar 100 and cups 119 extend from the plate 85 for the springs 117.

A pair of links 125 are pivoted at one end of each of the pins 105. An actuating shaft 128 having the threaded shank 129 at one end is journaled in the supporting brackets 69. Arms 130 are indicated with the hubs 131 and the latter are fastened to the shaft 128. The lower end of each arm 130 has the bifurcated end 134, which is pivoted to one of the links 125 by the pin 135.

A plate 136 is bolted to the outer face of the drum 47 and has extending therefrom the flexible bushing 137, which latter extends through an opening in said drum 47. A shaft extension 140 extends through the bushing 137 and has formed therewith the threaded opening 141 at one end, which engages the threaded shank 129. A lock washer 142 on the shank 129 locks the shaft 128 and the extension 140 to each other.

A collar 143 is integral with one end of the extension 140. An actuating lever 144 has one end supported on the extension 140 and bears against the collar 143. A nut 146 is in threaded engagement with the outer end of the shaft extension 140 and a lock washer 147 encircles the extension 140.

A cam 148 is keyed to the actuating shaft 128. A lift rod 150 is shown with the heel 151, which latter bears on the cam 148. A supporting head 153 is in threaded engagement with the upper end of the lift rod 150, and a nut 154 locks the head 153 to the rod 150. A pinion gear supporting ring 155 is rotatively supported on the annular flange 84, and has formed therewith the corrugated outer circumferential surfaces 156. Three bolts each having the flange collar 158, are keyed to and extend through the ring 155, and each of said bolts has journaled thereon a pinion gear 159.

A supporting bracket 160 is bolted to the wall 46 and is provided with a clamping screw 161. A pull cable 162 has one end fastened to the lever 144 and its other end is attached to the brake pedal of the vehicle not shown.

An external ring gear 163 is supported on the rotating sleeve 83, and the said ring gear 163 meshes with the pinion gears 159.

An annular shaped oil guard disc, preferably of compressed felt, is indicated at 163a, see Figs. 1, 5 and 6, and is shown with the depressed portion 163b, the flange 163c and the openings 163d and 163e. The said oil guard disc 163a is fastened to the gear 163 by screws, not shown, extending through the openings 163e. The openings 163d provide clearances for the heads 171 of the push rods 170, to be described.

An annular plate 164 is positioned between the annular flange 84 and the ring gear 163. Bolts 165 clamp the ring gear 163, the annular plate 164, the annular flange 84 and the annular plate 85.

It will be noted that the plates 85 and 164 retain the pinion gear supporting ring 155 in operative position.

Slidable push rods 170 having the heads 171 integral therewith and the heads 172 detachably connected thereto slidably extend through the plate 85, the flange 84, the plate 164 and the ring 163. A supporting ring 174 has indicated at its lower end the slot 175, and the walls of said slot are concentric with the axis of the axle 20, and the said supporting ring 174 is held in place or position by means of the bolts 176. One end of each of the bolts 176 is in threaded engagement with the disc 61 and locked thereto by the nut 177. The other end of the bolts 176 extends through the supporting ring 174 and each are clamped in place by the nuts 178. A pair of the bolts 176 slidably extend through the outer ends of the brackets 108, preventing the thrust collar ring 104 from turning with the thrust collar 100.

A rock shaft 185 having the collar 186 integral therewith, and the collar 187 connected thereto, has one of its ends seated in the disc 61, and its other end extends through the supporting ring 174. A rocker 188 is fastened to the rock shaft 185. A link 189 has one end pivoted to the rocker 188.

A brake band 190 at one end has integral therewith the bifurcated arm having the members 191, the latter having the openings 192 and the openings for the pin 193. The link 189 connects the rocker 188 and the pin 193 of the arm having the bifurcated members 191. The lower end of the brake band 190 has integral therewith the lug 194.

A second brake band 200 has integral therewith at its upper end the bifurcated arm having the members 201, similar to 191. In the upper ends of the arms 201 are the openings 202, and in the lower end of said arms 201 are openings for the pin 203.

The inner faces of the brake bands 190 and 200 are corrugated as shown at 204 in Fig. 1 to engage the surface 156 of the pinion gear supporting ring 155.

A link 205 similar to 189 has one end pivoted to the rocker 188, and its other end is pivoted to the arms 201 by means of the pin 203. A lug 206 is integral with the lower end of the brake band 200. A pair of similar bolts 208 extend through the lugs 194 and 206. Each of the bolts 208 has the flat head 209 at one end and supports the detachable spacing collar 210 and one of the said brake bands 190 or 200. Nuts 211 and 211a are provided for the bolts 208. A washer is shown at 212 for the nut 211, and a similar washer is provided for the nut 211a. By means of the slot 175 the lugs 194 and 206 can be fastened different distances apart to take up the wear of the brake bands 190 and 200.

A lever 216 having the hook end 217 is keyed to the rock shaft 185. A spring 218 extends between the hook end 217 and the lug 71 of the guide bracket 70.

To the rotating sleeve 83 are detachably bolted three curved clamping plates 220 having tapered end walls 221, by means of the bolts 222. Upon the sleeve 83 are detachably positioned the concavo-convex supporting plates 224 having the tapered end walls 225. The walls 225 bear against the adjacent walls 221 of the clamping plates 220. Integral with or fastened to each supporting plate 224 are indicated a pair of oppositely positioned anchor brackets 228. A guide plate 229 is at right angles to and integral with each of the anchor brackets 228.

Three similar concavo-convex shaped brake shoes 230 are indicated with the end walls 231. A brake lining 232 is carried on the outer face of each brake shoe 230. A pair of springs 234 have each one end connected to each of the brake shoes 230, and their other ends are connected to their adjacent supporting brackets 228. A bifurcated bracket having the members 235 extends from each of the said brake shoes 230. A pin 236 is supported in the members 235.

Between the faces of the guide plates 229 of each anchor bracket 228 is slidably positioned the crosshead 240, having the guide extensions 241. The pin 236 extends through the bracket 235 and the crosshead 240. A bifurcated lug 244 is integral with or fastened to each supporting plate 224 and a bell crank having the arms 246 and 247 is pivoted in each lug 244. The heads 171 of the push rods 170 are adapted to bear against the adjacent arms 246. A lever 252 having the arm 253 and the arm with the bifurcated eye end 258, is pivoted to each of the brackets 228 by the pivot 254a. Each pair of the arms 253 bear against the adjacent arm 247. A pair of links 255 is pivoted to each brake shoe 230 by means of the pin 256. Each of the links 255 has the threaded shank 259, which is in threaded engagement with the body of the bracket 235, and is adjustably clamped in position by the jam nut 260. Each of the links 255 is pivoted to the adjacent lever 252 at its eye end 258, by means of the pivot 261.

It will be noted that the curved clamping plates 220 fastened to the rotating sleeve 83, permit the removal and replacement of one or more of the concavo-convex supporting plates 224 with their individual brake shoes 230 and their appurtenances supported thereon.

Referring to Figs. 1, 2 and 3 and the rear axle of the vehicle, to clamp the brake bands 190 and 200, against the pinion gear supporting ring 155, the operator pulls the pull cable 162 in the direction of the arrow A, Fig. 1, which swings the actuating lever 144 and thereby the actuating shaft 128 is swung counter clockwise. Thereby the cam 148 raises the lift rod 150, and the lever 216 is swung upwardly, which partially turns the rock shaft 185. By this means the rocker 188 is swung in the direction of the arrow B, Fig. 3. Thereby the links 189 and 205 move in opposite directions and the brake bands 190 and 200 are drawn towards each other to tightly clamp them against the pinion gear supporting ring 155.

It will be noted the brake bands 190 and 200 when actuated by the cam 148 remain clamped against the pinion gear supporting ring 155, and thereby prevent rotation of the said pinion gear supporting ring 155.

At the time the brake drum 35 is turning the internal ring gear 42 turns the pinion gears 159. Thereby the external ring gear 163 is turned, which turns the rotating sleeve 83 in a direction opposite to the rotation of the brake drum 35.

It will be noted the oil guard disc 163a, prevents grease or oil entering the interior of the brake drum 35.

With the partial rotation of the actuating shaft 128, the arms 130 are swung in the direction of the arrow C, Fig. 1, and the thrust collar 100 is moved in the same direction. When the thrust collar 100 contacts with the push rods 170 the latter are moved in the direction of the arrow C, Fig. 1, and thereby the bell cranks having the arms 246 and 247 are swung down. The arms 247 Fig. 2, bear against the arms 253 of the levers 252 and the bifurcated eye ends 254 move the links 255, by means of which the brake shoes 230 are moved and the brake linings 232 are brought to bear against the inner face of the brake drum 35.

It will be noted the brake shoes 230 with their brake linings 232 are brought to bear against the inner face of the brake drum 35, by means that bear the surface of the brake lining 232 on each brake shoe 230 evenly against the surface of the brake drum 35.

By adjusting the nuts 260 the distance between the brake drum 35 and the brake shoes 230 can be varied, to function one or more of the said brake shoes 230 with the brake drum 35.

To release the brake shoes 230 from the brake drum 35, the operator releases the pull cable 162, and the tension of the springs 234, pull the brake shoes 230 from the drum 35. At the same time the tension of the springs 117 move the thrust collar 100, in the direction of the arrow B, Fig. 1, by means of which the cam 148 permits the lift rod 150 to be lowered by the tension of the spring 218. By this means the rock shaft 185 swings clock-wise, and the brake bands 190 and 200 are released from clamping the pinion gear supporting ring 155, and the rotating sleeve 83 stops turning in a direction opposite to the rotation of the drum 35.

By means of the nut 154 of the lift rod 150, the supporting head 153 can be vertically adjusted to vary the circumferential contact of the brake bands 190 and 200 with the pinion gear supporting ring 155.

By means of the bolts 208 and the slot 175, in the supporting ring 174, the distance between the lower ends of the brake bands 190 and 200 can be varied.

By means of the adjusting pin 107, the thrust collar ring 104 is located in operative position.

It will be noted that the distance between the thrust collar ring 104 and the pin 135 may be varied by substitution of a similar link 255 for said link 125.

In case the disc 61 is to be removed from the end wall 46, without changing the adjusted position of the pin 107, the clamping nut 107a is unscrewed from said pin 107 to allow the latter to be withdrawn with the disc 61.

It is to be further noted that the brake shoes 230 are not revolving with the rotation of the brake drum 35, when the brake bands 190 and 200, Fig. 3, are not in contact with their coacting pinion gear supporting ring 155, Fig. 1. It is also to be noted that the brake shoes 230 are revolving with the rotation of the brake drum 35, when the brake bands 190 and 200 are in contact their coacting pinion gear supporting ring 155.

It is also to be noted that the drawings, with the exception of Fig. 1, do not show the usual leaf spring of the axle of the vehicle.

It will be noted that the barrel 60 and the disc 61, on removal of the oil cup 65, the pin 74, the roller bearing housing 72, the bolts 82, and the shaft extension 140, can be removed with their appurtenances.

It will be noticed that the rotating sleeve 83, on removal of the pin 93, the collar 90 and the links 125, can be removed with its appurtenances.

Various modifications may be made in the invention and the present exemplifications are to be taken as illustrative and not limitative thereof.

Having described the invention I claim:

1. The combination of a brake drum, an internal ring gear fastened to the brake drum, a plurality of pinions in mesh with said internal ring gear, an axle housing, an axle in said housing, a wheel fastened to the outer end of said axle, said drum fastened to said wheel, a supporting barrel fastened to said axle housing, a sleeve rotatively supported on said barrel, stop collars on said supporting barrel to maintain said sleeve in position, means to lubricate the bearing surface of said sleeve, an external ring gear supported on said sleeve, an annular flange for said sleeve, said external ring gear fastened to said annular flange, the latter gear in mesh with said pinions, a pinion gear supporting ring rotatively supported on said annular flange, a detachable annular plate fastened to said annular flange to maintain said pinion gear supporting ring in position, axle bolts fastened to the pinion gear supporting ring and rotatively supporting said pinions, brake bands coacting with said pinion gear supporting ring, means to contact said brake bands with said pinion gear supporting ring, means to release said bands from said contact with the pinion gear supporting ring, brake shoes in connection with said sleeve, brake linings for said brake shoes, means to contact the brake shoes with the brake drum and release them therefrom, and an oil guard disc fastened to said external ring gear.

2. The combination of a brake drum, an axle housing coaxial with the brake drum, said housing having a wall at right angles thereto, a rotatable axle in said housing, connections between the axle and the brake drum to rotate the latter, a supporting barrel having a disc at one end thereof supported on the axle housing, said barrel detachably fastened to said wall, a sleeve rotatively and detachably supported on said barrel, means to maintain said sleeve in position, means interposed between said brake drum and said sleeve to rotate the sleeve at a speed different from the speed of the brake drum, a supporting ring connected to said disc, brake bands supported on said supporting ring, said brake bands coacting with the means interposed between the brake drum and sleeve, brake shoes in slidable relation with said sleeve, means to contact said brake shoes with said brake drum and means to release the same.

3. The combination of a brake drum, a sleeve, means to rotate the sleeve at a speed different than the rotation of the brake drum, means to stop the sleeve from rotating with the brake drum, brake shoes in slidable relation with said sleeve, means to contact said brake shoes with said brake drum, and means to release said brake shoes from the said brake drum.

4. The combination of a rotating brake drum, a sleeve, means to rotate the sleeve in a direction opposite to the direction of the rotation of the brake drum, means to stop the sleeve from rotating with the brake drum, brake shoes in moveable relation with said sleeve, means to contact said brake shoes with said brake drum and means to release said brake shoes from said brake drum.

5. The combination of the wheel of a vehicle, a brake drum fastened to the wheel, a gear rotating with the drum, an axle connected to said wheel, an axle housing supporting said axle, said housing having a wall at right angles thereto, a drum extending from said wall, a supporting barrel encircling said housing, a disc for the supporting barrel, a sleeve rotatively supported on said barrel, means to lubricate the bearing surface of said sleeve, an annular flange for said sleeve, a pinion gear supporting ring rotatively supported on said annular flange of the sleeve, means to maintain the pinion gear supporting ring in position, a brake band to engage the said pinion gear supporting ring, means to contact the brake band with said pinion gear supporting ring and to release it therefrom, bolts extending from the pinion gear supporting ring, pinions journaled on said bolts, said pinions in mesh with said gear and rotating with said drum, a second gear supported on the said sleeve, said second gear fastened to the said annular flange thereof and in mesh with said pinions, an oil guard disc fastened to said second gear, a plurality of concavo-convex supporting plates supported on said sleeve, a pair of anchor brackets extending from each of said concavo-convex supporting plates, a guide plate for each anchor bracket, a crosshead slidably positioned between each pair of anchor brackets, means to maintain said crosshead in position, a brake shoe opposite each pair of anchor brackets, a bifurcated bracket extending from each brake shoe, a pin connecting each crosshead with its accompanying bifurcated bracket, a lever pivoted to each anchor bracket, a link for each lever having one end pivoted thereto, each of said links in pivotal connection with one end of said brake shoes, means to vary the length of said links and clamping plates fastened to said sleeve and engaging said concavo-convex supporting plates, said brake shoes coacting with said brake drum.

6. The combination of a brake drum, a brake coacting with the brake drum, means to revolve the brake with the rotations of the brake drum, an actuating shaft adjacent to the brake drum, means to oscillate said shaft, a rock shaft adjacent to the actuating shaft, a pair of brake bands adjacent to the brake drum, a cam fastened to the actuating shaft, a lever fastened to the rock shaft, a lift rod interposed between the said cam and said lever, a rocker fastened to the rock shaft, a pair of links each having one end pivoted to said rocker, the other ends of said links pivoted to the brake bands, a spring having one end connected to said lever, said lever bearing on the upper end of said lift rod, and the lower end of said lift rod bearing on the said cam, means to vary the length of said lift rod, a supporting ring adjacent to the said brake bands, said brake bands pivoted to said supporting ring, said supporting ring having a slot to adjust the brake bands to or from each other, a pinion gear supporting ring adjacent to the supporting ring, means to contact the brake bands with said pinion gear supporting ring and means to release the same, a slidable thrust collar adjacent to the brake drum, connections between the actuating shaft and the thrust collar to slidably move the thrust collar, a plurality of springs having each one end bearing against said thrust collar to return the thrust collar to its original position, connections interposed between the thrust collar and the brake to move the brake against the brake drum and release the brake therefrom and springs having each one end connected to said brake, to move the latter to a non-operative position.

7. The combination of a rotating brake drum, a brake coacting with the brake drum, means to revolve the brake in a direction opposite to the rotation of the brake drum, an actuating shaft adjacent to the brake drum, means to oscillate said shaft, a slidable thrust collar adjacent to the brake drum, connections between the actuating shaft and the thrust collar, means to adjust the position and limit the movement of the thrust collar, a thrust collar ring supported on the thrust collar, means to adjust and limit the movement of the thrust collar ring and said thrust collar in one direction, slidable push rods positioned adjacent to said push rods with said thrust collar, a bell crank pivoted adjacent to each push rod, an arm of the bell crank swung in one direction by its adjacent push rod, a pair of levers each pivoted adjacent to the other arm of said bell crank, one of the arms of each of said levers swung by its coaction with one of the arms of said bell crank, a link having one end pivoted to the other arm of said lever, the other ends of said links pivoted to the brake, means to vary the length of said links and springs each having one end connected to said brake to release it from said brake drum.

8. The combination of a rotating brake drum, a brake for the brake drum, means to revolve the brake in a direction opposite to the rotation of the brake drum, an actuating shaft, means to oscillate said shaft, a thrust collar, a thrust collar ring supported on the thrust collar, means interposed between said shaft and said thrust collar to slide the latter with the oscillations of the shaft, means to adjust the position and limit the movement of the thrust collar ring and the said thrust collar and means interposed between the thrust collar and said brake to move the latter with a movement of the thrust collar.

9. The combination of a rotating brake drum, a brake for the brake drum, means to revolve the brake in a direction opposite to the rotation of the brake drum, means to release or stop the said brake from revolving in said direction, an actuating shaft adjacent to the brake drum, means to oscillate said shaft, an axle housing extending into the brake drum, said housing having a wall at right angles thereto, a disc fastened to said wall, a supporting barrel in connection with said disc supported on the axle housing, a pair of brackets extending from said disc supporting the actuating shaft, a supporting ring in connection with said disc, a pair of brake bands having one end of each pivoted to said ring, connections between said actuating shaft and said brake bands to move the latter to or from each other, means to adjust the brake bands to or from each other, a sleeve rotatively and detachably supported on said barrel, a thrust collar slidably supported on said sleeve, connections between the actuating shaft and said thrust collar to move said thrust collar from and to said disc, a thrust collar ring supported on said thrust collar, connections between said thrust collar ring and said disc to maintain said thrust collar ring in a non-rotative position, brake shoes for the brake, brake linings for the brake shoes, connections interposed between the thrust collar and said brake shoes to move said brake shoes with their linings into contact with the brake drum and to release the same and a drum for the said wall enclosing the thrust collar, the brake bands and their appurtenances.

10. In combination a brake drum, means to turn the brake drum, a brake within the brake drum, connections between the brake drum and the brake to revolve the latter, an actuating shaft spaced from the brake coacting with said connections to start, reverse or stop the revolutions of the brake, connections between the actuating shaft and the brake to force the latter to bear against the brake drum and means to release the brake from the brake drum.

WALTER H. PARNELL.